United States Patent [19]

Hirosawa et al.

[11] 4,086,994
[45] May 2, 1978

[54] FLUID PRESSURE MODULATING APPARATUS FOR A FLUIDICALLY ACTUATED FRICTIONAL ENGAGING APPARATUS IN A VEHICLE TRANSMISSION

[75] Inventors: Koichiro Hirosawa; Tsunehiko Ogasahara, both of Kariya; Kazuo Ishikawa, Hoi; Noboru Murakami, Nagoya, all of Japan

[73] Assignee: Aisin Seiki Kabushiki Kaisha, Kariya, Japan

[21] Appl. No.: 636,871

[22] Filed: Dec. 2, 1975

[30] Foreign Application Priority Data

Dec. 11, 1974 Japan .................................. 49-142796

[51] Int. Cl.² ........................................................ F16D 25/10
[52] U.S. Cl. ................................. 192/109 F; 192/.075; 192/87.19; 137/505.15
[58] Field of Search ............... 192/109 F, 85 R, 87.18, 192/87.19

[56] References Cited

U.S. PATENT DOCUMENTS

| | | | |
|---|---|---|---|
| 3,389,770 | 6/1968 | Golan et al. ..................... | 192/109 F |
| 3,583,422 | 6/1971 | Dach ................................. | 192/109 F |
| 3,618,424 | 11/1971 | Golan et al. ..................... | 192/109 F |
| 3,674,121 | 7/1972 | Copeland ......................... | 192/109 F |
| 3,709,065 | 1/1973 | Starling ............................ | 192/109 F |
| 3,722,646 | 3/1973 | Oguma ............................. | 192/109 F |
| 3,809,201 | 5/1974 | Miyanishi et al. ................ | 192/109 F |
| 3,820,417 | 6/1974 | Allen ................................ | 192/109 F |
| 3,896,705 | 7/1975 | Patton ............................. | 192/109 F |

Primary Examiner—Benjamin W. Wyche
Attorney, Agent, or Firm—Sughrue, Rothwell, Mion, Zinn and Macpeak

[57] ABSTRACT

This invention relates to a fluid pressure supplying method for fluidically actuating a frictional engaging apparatus in a vehicle transmission, including the steps of supplying high pressure to actuate the frictional engaging apparatus, reducing the high pressure to a lower pressure when the frictional engaging apparatus is initially engaged, and increasing the fluid pressure to line pressure in the frictional engaging apparatus after the frictional engaging apparatus is fully engaged, thereby smoothly engaging the frictional engaging apparatus without giving a shock to the apparatus and reducing the engaging time of the frictional engaging apparatus.

2 Claims, 12 Drawing Figures

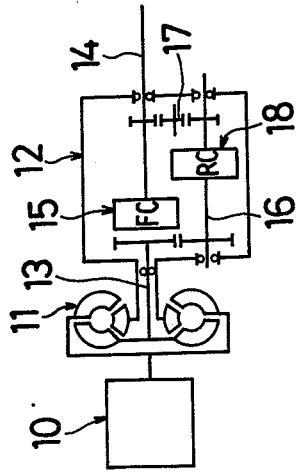
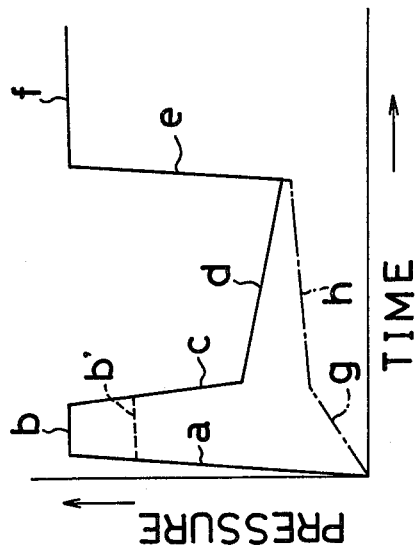
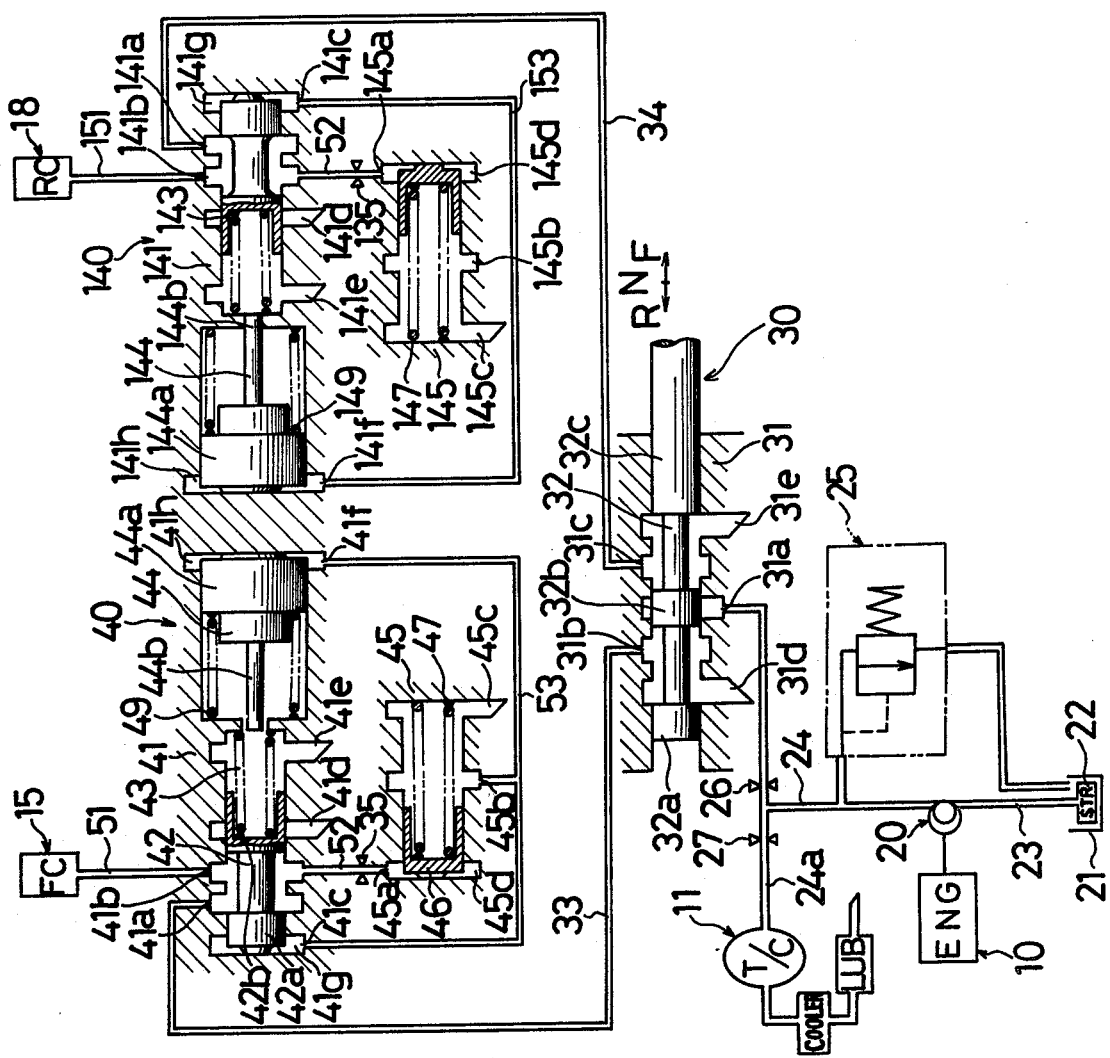
FIG. 1
FIG. 6
FIG. 2

FLUID PRESSURE MODULATING APPARATUS FOR A FLUIDICALLY ACTUATED FRICTIONAL ENGAGING APPARATUS IN A VEHICLE TRANSMISSION

BACKGROUND OF THE INVENTION

1. Field of the Invention

The present invention relates generally to a frictional engaging apparatus for a fluidically actuated clutch or brake and more particularly to a fluid pressure supplying method and apparatus for a fluidically actuated frictional engaging apparatus for speed changing or direct shifting in a vehicle transmission.

2. Description of the Prior Art

Conventionally, a modulator valve is disposed within a conduit which supplies an actuating fluid pressure to a fluidically actuated frictional engaging apparatus for a vehicle transmission. The modulator valve is operable upon direct shifting or change-speed shifting and slowly increases the supplying fluid pressure, thereby reducing the engaging shock of fluidically actuated frictional engaging apparatus.

However, when the capacity of the fluidically actuated frictional engaging apparatus is large and the free stroke of a piston within the fluidically actuated frictional engaging apparatus, prior to initial engagement, is also large, it takes a relatively long time to engage the piston, and when the above-mentioned modulator valve is utilized, it takes even more time to engage the fluidically actuated frictional engaging apparatus and an unpleasant feeling is transmitted to the driver and idle racing of the engine with a loud roar occurs.

In this invention, line pressure or high pressure close to line pressure is supplied during the free stroke of a piston within a fluidically actuated frictional engaging apparatus and the piston in rapidly moved until initial engagement of the piston occurs whereupon the engaging pressure is lowered and is thereafter slowly increased, thereby smoothly engaging the fluidically actuated frictional engaging apparatus without shock while reducing the engaging time of the fluidically actuated frictional engaging apparatus.

SUMMARY OF THE INVENTION

It is an object of this invention to provide a fluid pressure supplying method and apparatus for a fluidically actuated frictional engaging apparatus as a vehicle transmission for obviating the above-mentioned conventional drawback.

It is another object of this invention to provide a fluid pressure supplying method and apparatus for a fluidically actuated frictional engaging apparatus in a vehicle transmission which is able to smoothly engage without giving a shock to the driver or passengers.

It is still another object of this invention to provide a fluid pressure supplying method and apparatus for a fluidically actuated frictional engaging apparatus in a vehicle transmission which is able to reduce the engaging time thereof.

A more complete appreciation of the invention and many of the attendant advantages thereof will be readily apparent as the same becomes better understood by reference to the following detailed description when considered in connection with the accompanying drawings.

BRIEF DESCRIPTION OF THE DRAWINGS

FIG. 1 is a diagrammatic view of a transmission according to the invention.

FIG. 2 is a partial sectional view of a clutch operating fluid circuit utilized in the invention.

FIG. 6 is a similar view to FIG. 3, however, showing a modulated pressure by the modulator valve utilized in FIG. 5.

BRIEF DESCRIPTION OF THE PREFERRED EMBODIMENTS

Figure 5:
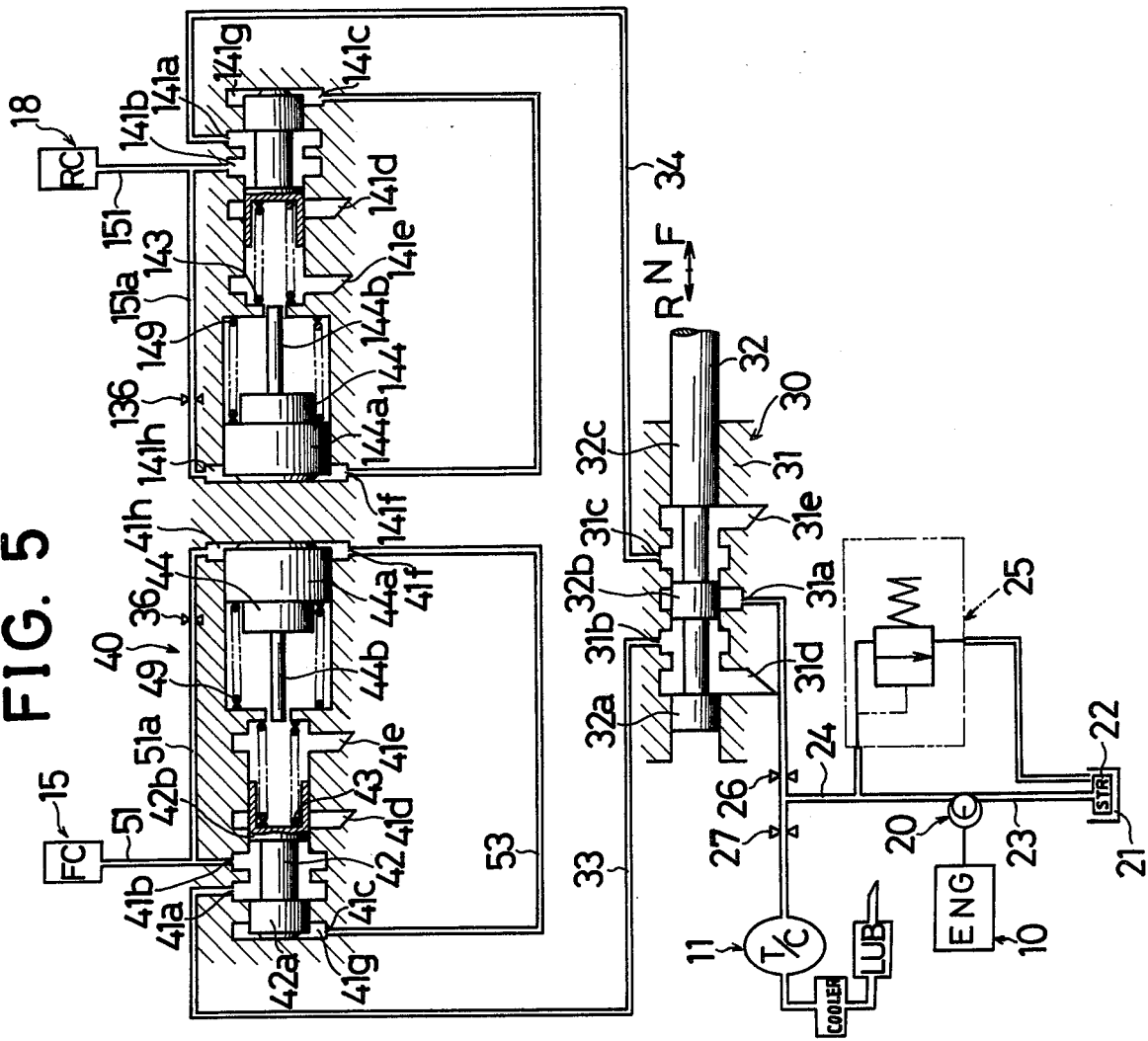
FIG. 5 is a similar view to FIG. 2, however, showing a second embodiment of the invention.

Referring now to the drawings, particularly to FIG. 1 thereof, the reference numeral 10 denotes an engine which drives an input shaft 13 of a transmission 12 via a torque converter 11. The transmission 12 includes a forward clutch 15 for operatively connecting an output shaft 14 to the input shaft 13, and a reverse clutch 18 for transmitting the driving force of the input shaft 13 to the output shaft 14 via a counter shaft 16 and an idler gear 17.

In FIG. 2, an oil pump 20 is driven by the engine 10 and sucks the hydraulic fluid from an oil tank 21 via a strainer 22 and a conduit 23 which discharges into a conduit 24. The conduit 24 is fluidically connected to a regulator valve 25 and the fluid pressure within the conduit 24 is maintained at a certain pressure by the regulator valve 25. The conduit 24 is fluidically connected to a port 31a of a manual valve 30 for forward and reverse changing via an orifice 26. A conduit 24a branched from the conduit 24 is provided with an orifice 27 therein and is fluidically connected to the torque converter 11 and supplies the circulated fluid to the torque converter 11.

The manual valve 30 includes a valve body 31 having ports 31a, 31b, 31c, 31d, 31e therein, and a valve 32 slidably disposed within the valve body 31 and having lands 32a, 32b, 32c of the same diameter. The ports 31d and 31e are drain ports opened into the oil tank 21. The port 31b is fluidically connected to an inlet port 41a of a first modulator valve 40 through a conduit 33 and the port 31c is fluidically connected to an inlet port 141a of a second modulator valve 140 through a conduit 34.

The first modulator valve 40 includes a first valve body 41 having ports 41a, 41b, 41c, 41d, 41e, 41f therein, a first valve 42 slidably disposed within the first valve body 41 and having lands 42a, 42b, a second valve 44 slidably disposed within the first valve body 41 having a land 44a with larger diameter than that of lands 42a, 42b and a rod portion 44b projected from the land 44a at the side of first valve 42. A first spring 43 is interposed between the first valve 42 and the first valve body 41 for urging the first valve 42 in one direction and a second spring 49 is interposed between the second valve 44 and the first valve body 41 for urging the second valve 44 in the opposite direction. A second valve body 45 is provided with ports 45a, 45b, 45c, a piston 46 slidably disposed within the second valve body 45, and a spring 47 interposed between the second valve body 45 and the piston 46 for urging the piston 46 to the left. The port 41b is fluidically communicated with a servo chamber, not shown, of the forward clutch 15 via a conduit 51 and is fluidically communicated with the port 45a of the second valve body 45 via a conduit 52 having an orifice 35 therein. The ports 41c, 41f are fluidically communicated with each other via a conduit 53 which is fluidically communicated with the port 45b of the second valve body 45. The ports 41d, 41e, 45c, are drain ports communicated with the oil tank 21. The second modulator valve 140 has the same construction and operation as the first modulator valve 40 and the details are therefore omitted from the detailed description. The numerals, however, are in the one-hundred series to prevent confusion.

The operation according to FIG. 2 will now be described hereinbelow in detail:

When the engine 10 of the vehicle is set in motion, the engine 10 drives the oil pump 20 and supplies the pressurized fluid into the conduit 24. The pressurized fluid within the conduit 24 is modulated to a certain line pressure by the regulator valve 25. The line pressure is adequately decreased via the conduit 24a having the orifice 27 therein and is supplied to the torque converter 11 and is also supplied to the port 31a of the manual valve 30 via the orifice 26. In the case where the valve 32 of the manual valve 30 is a neutral position "N" as shown, the port 31a is interrupted by the land 32b and is not communicated with the ports 31b, 31c. Since the ports 31b, 31c are communicated with the drain ports 31d, 31e, respectively, the pressurized fluid is not supplied to the forward and reverse clutches 15, 18 and the forward and reverse clutches 15, 18 are not connected. When the valve 32 of the manual valve 30 is shifted from the above-mentioned "N" position to the position "F" or "R", the pressurized fluid is supplied to the forward clutch 15 or the reverse clutch 18, thereby accomplishing the forward drive or the reverse drive of the transmission. The pressurized fluid supplied to clutches 15, 18 is regulated by the modulator valves 40, 140, respectively, as shown by solid line in FIG. 3.

The operation of modulator valve 40 is described hereinbelow in detail:

When the valve 32 of the manual valve 30 is shifted to the forward position "F", the pressurized fluid supplied to the port 31a is transmitted to the port 31b via the groove between lands 32a and 32b and is supplied to the inlet port 41a of the modulator valve 40 through the conduit 33. The pressurized fluid supplied to the inlet port 41a is transmitted to the port 41b via the groove between the lands 42a, 42b of the valve 42. The pressurized fluid supplied to the port 41b is then transmitted to a servo chamber, not shown, of the forward clutch 15 via the conduit 51 and is also transmitted to an accumulator chamber 45d via the conduit 52 having the orifice 35. However, since the orifice 35 is disposed within the conduit 52, the fluid pressure within the port 41b is more rapidly increased than that within the accumulator chamber 45d as shown by solid line "a" in FIG. 3. This rapid increase of the fluid pressure is continued until it reaches a certain pressure as shown by solid line "b" in FIG. 3. The discharging capacity of pump 20, fluid resistance of conduits 24, 33, and capacity of accumulator chamber 45d are related to each other in this case.

It is understood that the pressure indicated by the solid line "b" may be set at various levels below line pressure depending on the discharging capacity of pump 20, fluid resistance of conduits 24, 33, and capacity of accumulator chamber 45d. At this time, the piston, not shown, of forward clutch 15 is gradually moved in the engaging direction as shown by a broken line "k" in FIG. 4. The piston 46 is also gradually moved to the right against the biasing force of spring 47 by the increase of fluid pressure within the accumulator chamber 45d at this time. When the piston 46 moves a preset distance, the port 45b is opened and is communicated with the port 45a so that the fluid pressure within the accumulator chamber 45d is then transmitted to the chambers 41g, 41h via the conduit 53. The valve 42 is moved to the right by the fluid pressure supplied to the chamber 41g against the biasing force of the spring 43, so that the inlet port 41a is gradually cut-off and the drain port 41d is opened and the fluid pressure in port 41b is decreased and regulated at a certain lower pressure than the solid line "b" as shown by solid line "c" in FIG. 3. The increase of fluid pressure within the chamber 41g is changed as shown by a chain-dotted line "g" in FIG. 3. It is established that the maximum value of chain-dotted line "g" is lower than the minimum value of solid line "c". The fluid pressure within chambers 41g, 41h is, therefore, gradually increased as shown by a chain-dotted line "h". Accordingly, the fluid pressure in port 41b is gradually decreased as shown by a solid line "d" in FIG. 3. The second valve piston 44 is moved to the left by the increase of fluid pressure within the chamber 41h (chain-dotted line "h" in FIG. 3) against the biasing force of the second spring 49 at this time. An end portion of the rod 44b of the second valve piston 44 is contacted with the first valve 42 by the leftward movement of the second valve 44 and the first valve 42 is directly moved by the second valve 44. The pressure receiving area of valve 44 within the chamber 41h is larger that that of valve 42 within the chamber 41g, so that the regulating function of valve 42 is stopped and the ports 41a, 41b are directly communicated to each other. Consequently, the fluid pressure supplied within the conduit 51 is rapidly increased as shown by a solid line "e" and becomes the line pressure as shown by a solid line "f" in FIG. 3.

Figure 3:
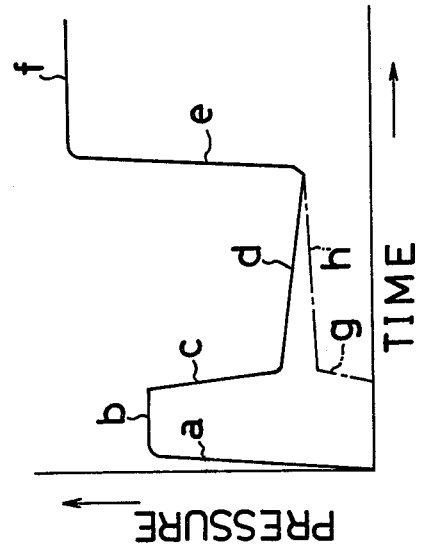
FIG. 3 is a graphic view showing a modulated pressure by the modulator valve utilized in FIG. 2.

In short, the fluid pressure in the discharging port 41b of the modulator valve 40 is changed as shown by the solid line in FIG. 3. In this case, it can be easily understood that when the magnitude of pressure indicated by solid line "b" is exactly controlled, the land 42a of the valve 42 has a smaller effective area than the land 42b so that the valve 42 is regulated by the pressurized fluid acting on the above-mentioned difference in areas. It takes very little time for the free stroke of the piston to occur in clutch 15 prior to initial engagement of the clutch 15 due to the relation of the fluid resistance of conduit 51 from the port 41b to the clutch 15 and the capacity within the pressure chamber, not shown, of clutch 15. The stroke of piston (not shown) of clutch 15 is smooth as shown by the chain-dotted line "k" and the engaging torque at this time is shown by a chain-dotted line "m" in FIG. 4. Thus, the clutch 15 is smoothly engaged without shock.

The construction and operation of the embodiment of FIG. 5 will now be described.

The accumulator comprised of the piston 46 and the spring 47 in FIG. 2 is replaced by an accumulator comprised of the second valve 44 and a spring 49 in FIG. 5. Fluid pressure is supplied to chamber 41h by a conduit 51a connected to conduit 51 fluidically communicated with the outlet port 41b via an orifice 36 and the pressurized fluid is then supplied from the accumulator chamber 41h to the chamber 41g via conduit 53.

In operation according to FIG. 5, when the pressurized fluid from the conduit 33 is supplied to the inlet port 41a, the pressurized fluid is discharged to the outlet port 41b through the groove between the lands 42a, 42b since the valve 42 is moved to the left by the urging force of spring 43 and is further supplied to the servo chamber of forward clutch 15 via the conduit 51 and to the accumulator chamber 41h via the conduit 51a having the orifice 36 therein. Accordingly, the pressurized fluid is rapidly increased to line pressure.

Assuming that it is designed that the diameter of land 42a of valve 42 is smaller than that of land 42b thereof, it can obviously be understood that the increasing limit of the above-mentioned pressurized fluid can be designed to be lower than the line pressure. The accumulator chamber 41h is fluidically communicated with the chamber 41g via the conduit 53, so that the fluid pressure within the chamber 41g acting on the land 42a is the pressure controlled by the orifice 36 and the accumulator. The fluid pressure within the accumulator chamber 41h and the chamber 41g is regulated by the orifice 36 and the accumulator and is gradually increased as shown by a chain-dotted line in FIG. 6. In the case where the fluid pressure within the chamber 41g rises above a predetermined value, the valve 42 is moved to the right by overcoming the urging force of the spring 43, the lands 42a, 42b of valve 42 operate to close the port 41a and open the drain port 41d so that the fluid pressure is then rapidly lowered to a lower value than line pressure and the fluid pressure in port 41b is controlled. Since the controlled pressure at this time is always higher than the pressure which is supplied to the accumulator chamber 41h via the orifice 36, regulated by the accumulator and further supplied to the chamber 41g, the fluid pressure within the accumulator chamber 41h and the chamber 41g is gradually increased and the pressure controlled by the valve 42 is gradually lowered in accordance with the above-mentioned increase of the fluid pressure. This is continued until the rod portion 44b of the piston 44 is in contact with the right end portion of the valve 42. After the rod portion 44b of the piston 44 is contacted with the right end portion of the valve 42, the pressure receiving area of the land 44a of piston 44 is larger than that of the land 42a within the chamber 41g, so that the regulating operation of the valve 42 becomes inoperative and the valve 42 is moved to the left, the pressurized fluid within the conduit 33 is, therefore, directly supplied to the port 41b through the groove between the lands 42a, 42b. Accordingly, the pressure discharged from the port 41b is rapidly increased. That is, when the fluid pressure is initially supplied to the inlet port 41a of the modulator valve 40, the change of fluid pressure supplied to the chamber 41g is shown by a chain-dotted line in FIG. 6 and the change of fluid pressure at the outlet port 41b is shown by a solid line in FIG. 6. Accordingly, the changes of the piston stroke and the clutch engaging torque are substantially identical with FIG. 4.

Next referring to FIG. 7, the differences in construction and operation of FIG. 7 from that of FIG. 2 will now be described.

The modulator valve 40 includes a valve body 41 having ports 41a, 41b, 41c, 41d, 41e, 41f therein, a first valve 42 slidably disposed within the valve body 41 and provided with lands 42a, 42b, and a second valve 44 slidably disposed within the valve body 41 and provided with a land 44a having larger diameter than that of lands 42a, 42b and with a rod portion 44b projected from the land 44a toward the first valve 42. A first spring 43 is interposed between the first valve 42 and the valve body 41 for urging the first valve 42 to the left as viewed in FIG. 7 and a second spring 49 is interposed between the second valve 44 and the first valve body 41 to urge the second valve to the right. The port 41a is fluidically connected to the conduit 33. The port 41b is fluidically communicated with the servo chamber 15a of the clutch 15 via the conduit 51 and is also fluidically communicated with the accumulator chamber 41h via the conduit 51a connected to the conduit 51, the orifice 36 and the port 41f. The port 41c is fluidically communicated with the servo chamber 15a of clutch 15 via the conduit 53. The ports 41d, 41e are drain ports opened into the oil tank 21. The clutch 15 includes a clutch drum 15c fixedly attached to the input shaft 13, frictional plates 28 coupled to the clutch drum 15c by a spline coupling, frictional plates 29 coupled by splines to the clutch hub which is secured to the output shaft 14, a piston 15b for contacting the frictional plates 28, 29 under pressure, and a return spring 19 for returning the piston 15b. The servo chamber 15a is defined by the clutch drum 15c and the piston 15b and the conduits 51, 53 are fluidically connected to the servo chamber 15a.

The fluid pressure within the port 41b is rapidly increased as shown by solid lines "a", "b'" in FIG. 6, until the fluid pressure supplied within the servo chamber 15a becomes a preset value, i.e., the fluid pressure within the chamber 41g acting on the land 42a of the valve 42 overcomes the urging force of the spring 43 and the valve 42 is moved to the right and the drain port 41d is opened.

The conduits 51, 53 are fairly long and the cross-section area of the conduits 51, 53 is not very large so that the resistance of the conduits is equivalent to having orifices disposed within the conduits 51, 53. The fluid pressure within the servo chamber 15a can be increased to the pressure corresponding to the urging force of the return spring 19 until the pressurized fluid supplied within the servo chamber 15a moves the piston 15b to the right into contact with the frictional plates 28, 29 under pressure. Accordingly, the fluid pressure within the port 41b is a pressure lower than the line pressure (for example shown by the chain-dotted line "b'" in FIG. 6). The fluid pressure within the chamber 41g is gradually increased at the same time as shown by a chain-dotted line "g" in FIG. 6, and when the fluid pressure within the chamber 41g becomes greater than a preset presure, the valve 42 is moved to the right after overcoming the urging force of the spring 43 and the drain port 41d is opened. The hydraulic fluid discharged from the port 41b is regulated in order to balance the fluid pressure of chamber 41g and the urging force of the spring 43, the fluid pressure within the port 41b is rapidly lowered as shown by a solid line "c" in FIG. 6. The urging force of spring 43 is set up to become sufficiently higher than the fluid pressure within the chamber 41g which becomes a preset pressure. The fluid pressure within the chamber 41g becomes, therefore, higher than that within the port 41b at this stage and the fluid pressure within the chamber 41g is, thereafter, gradually increased as shown by a chain-dotted line "h" in FIG. 6, and the fluid pressure within the port 41b regulated by the valve 42 is, then, lowered according to the increase of fluid pressure within the chamber 41g as shown by a solid line "d". Thereafter, the second valve 44 which acts as an accumulator piston against the urging force of the spring 49 is moved to the left by the fluid pressure supplied from the port 41b to the accumulator chamber 41h via the orifice 36. Assuming that the left end of rod portion 44b of second valve 44 is contacted by the right end of the first valve 42, almost the same pressure is acted on the land 42a of first valve 42 and the land 44a of second valve 44 and the first and second valves 42, 44 are integrally moved to the left and the first valve 42 is then moved to the shown position of FIG. 7, namely, the first valve 42 is moved to the non-regulating position so that the fluid pressure supplied from the conduit 33 to the port 41a is directly transmitted to the port 41b, and the fluid pressure within the port 41b is rapidly increased as shown by a solid line "e" and becomes the line pressure as shown by a solid line "f".

Figure 4:
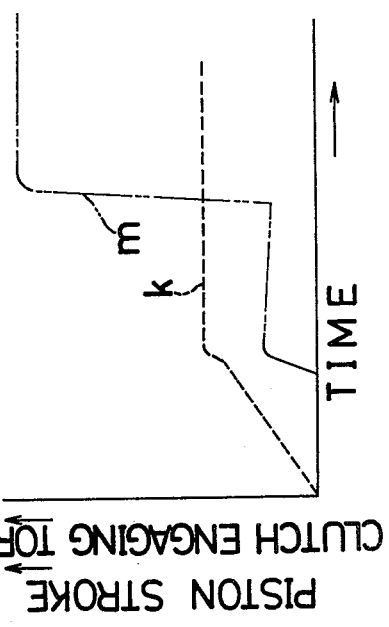
FIG. 4 is a graphic view showing the piston stroke of a clutch and clutch engaging torque according to the fluid circuit of FIG. 2.
Figure 7:
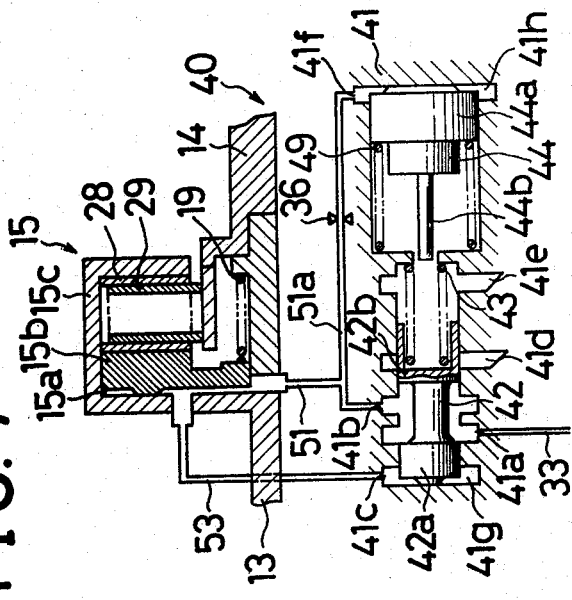
FIG. 7 is a similar view to FIG. 2, however, showing a third embodiment of the invention.

The engaging torque of clutch 15 resulting from the fluid pressure transmitted to the servo chamber 15a is varied in FIG. 7 as shown by the chain-dotted line in FIG. 4, thereby engaging the clutch 15 in a short time without producing a shock.

Figure 8:
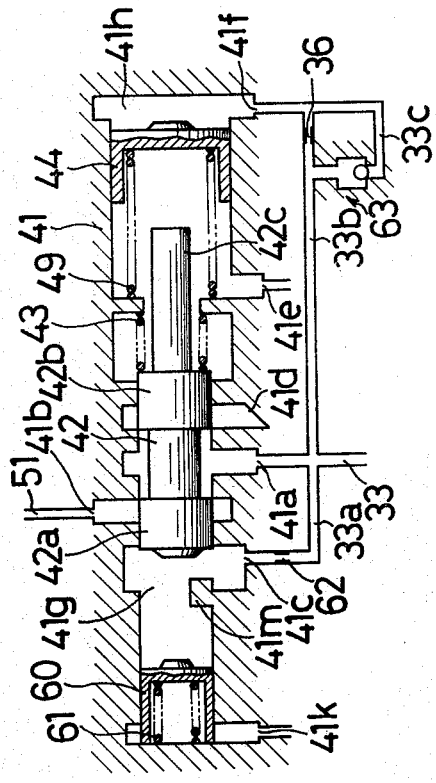
FIG. 8 is a similar view to FIG. 2, however, showing a fourth embodiment of the invention.

Referring now to FIG. 8 which is different from FIGS. 2, 7 in that the regulating operation attained by the first valve 42 provides a regulated fluid pressure which does not change and is almost a constant pressure during initiation of clutch engagement.

The differences in construction and operation of FIG. 8 from FIGS. 2, 7 will now be described hereinbelow in detail.

The modulator valve 40 includes a valve body 41 having ports 41a, 41b, 41c, 41d, 41e, 41f, 41k therein, a valve 42 slidably disposed within the valve body 41 and provided with lands 42a, 42b having same diameter and a rod portion 42c extending from the land 42b, a first accumulator piston 44 slidably disposed within the valve body 41 and provided with larger diameter than the lands 42a, 42b, a first spring 49 interposed between the valve body 41 and the first accumulator piston 44 for urging the first accumulator piston 44 to the right, a second accumulator piston 60 slidably disposed within the valve body 41, and a second spring 61 interposed between the valve body 41 and the second accumulator piston 60 for urging the second accumulator piston 60 to the right. The ports 41d, 41e, 41k are drain ports opened into the oil tank 21. The port 41a is an inlet port fluidically communicated with the conduit 33. The conduit 33 branches into conduits 33a, 33b and is provided with an orifice 62 in conduit 32a which is fluidically communicated with the port 41c. A bypass conduit 33c is provided in the conduit 33b, and one-way valve 63 is disposed in the bypass conduit 33c and prevents the transmission or pressurized fluid from conduit 33 to port 41f. The port 41b is fluidically communicated with the conduit 51 and is an outlet port for supplying the pressurized fluid to the clutch 15.

The operation of FIG. 8 will now be described hereinbelow in detail:

When the pressurized fluid is initially supplied to the conduit 33, the valve 42 and the second accumulator piston 60 are contacted with stopper 41m mounted on the valve body 41 by the urging force of springs 43, 61 so that the ports 41a, 41b are communicated with the groove between the lands 42a, 42b of valve 42. Accordingly, at the beginning when the pressurized fluid is supplied to the conduit 33, the pressure at inlet port 41a, is directly supplied to the outlet port 41b and the fluid pressure at the outlet port 41b rapidly increases as shown by a solid line "a" in FIG. 9. The maximum fluid pressure of drain port 41b at this time is not increased to the line pressure and is set at a pressure lower than the line pressure by the relation of the fluid resistance of conduit 51 and the capacity of servo chamber 15a of clutch 15 (including the free stroke time of piston 15b of clutch 15) during an accumulating operation.

However, assuming that the capacity supplied from the source of fluid pressure to the inlet port 41a is sufficient, a pressure decrease does not always occur. At this time the pressurized fluid is supplied to the accumulator chambers 41h, 41g through orifices 36, 62 so that the fluid pressure within the accumulator chambers 41h, 41g is, therefore, gradually increased. Accordingly, the spring 61 is compressed by the piston 60 within the chamber 41g and the piston 60 moves to the left to accommodate the pressure increase. Also the spring 49 is compressed by the piston 44 within the chamber 41h and the piston 44 moves to the left to accommodate the pressure increase. The pre-load of spring 61 is considerably smaller than that of spring 49, and is so set that the stroke of piston 60 is finished at the final stage of free stroke of piston 15b. Therefore, the fluid pressure within chamber 41g is increased and the valve 42 is moved to the right against the urging force of spring 43 by the increased pressure and the outlet port 41b is closed by the land 42a while the drain port 41d interrupted by the land 42b till then is fluidically communicated with the inlet port 41a. Condequently, the fluid pressure of the inlet port 41a is rapidly decreased as shown by a solid line "c" in FIG. 9 and the fluid pressure within the chamber 41g communicated via the orifice 62 is also lowered, thereby regulating the fluid pressure supplied from the inlet port 41a to the outlet port 41b and the clutch 15 at a substantially constant pressure as shown by a solid line "d" in FIG. 9. The pressurized fluid is also supplied to the chamber 41h via the orifice 36 during above-mentioned certain pressure, so that the accumulator piston 44 is moved to the left against the urging force of the spring 49. After the accumulator piston 44 is contacted with the rod portion 42c of valve 42, the force acted on the valve 42 is unbalanced and the valve 42 is moved to the left from position of FIG. 8 so that the drain port 42d is closed by land 42b while the inlet and outlet ports are communicated to each other, respectively. The regulating operation is inoperative and the fluid pressure of outlet port 41b is rapidly increased to the line pressure (shown by a solid line "f" in FIG. 9), it is shown by a solid line "e" in FIG. 9.

Figure 9:
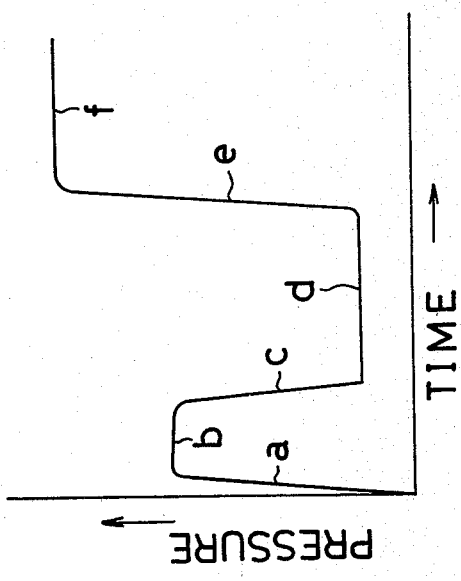
FIG. 9 is a similar view to FIG. 3, however, showing a modulated pressure by the modulator valve utilized in FIG. 8.
Figure 10:
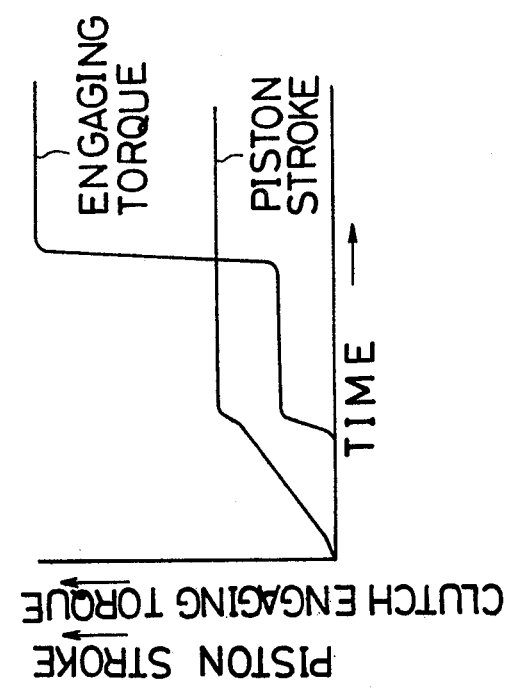
FIG. 10 is a similar view to FIG. 4, however, showing the piston stroke of a clutch and clutch engaging torque according to the fluid circuit of FIG. 8.

The change of stroke of the clutch piston 15b and the engaging torque of clutch 15 are shown by FIG. 10, thereby engaging the clutch 15 in a short time without producing a shock. The pressure which is diagramatically illustrated in FIGS. 3, 6, 9 and 12 is the pressure at the outlet port 41b of the first modulator valve. The piston stroke and engaging torque of the clutch which are the two priniciple parameters determining the smoothness of engagement of the clutch are shown in FIGS. 4 and 10. The rapid increase and decrease in pressure at the outlet port 41b of the first modulator valve 40 as shown by the lines a–b–c on the pressure-time graph occurs during the "free" portion of the piston stroke wherein the slack is being taken up. Once the slack is taken up the pressure at the outlet port 41b of the modulator valve 40 is regulated as shown by the line d at a fairly constant pressure as shown in FIG. 9 relating to the species of FIG. 8. It is during this period that the smooth engagement of the clutch takes place as shown by the engaging torque curve in FIG. 10. Once the clutch is fully engaged there is a rapid increase in the pressure at the outlet port 41b of the modulator valve 40 along the line e in FIG. 9 until line pressure f is reached. There is a corresponding rapid increase in engaging torque as shown in FIG. 10 until line pressure is reached at which point the engaging torque levels off. The foregoing explanation can best be understood by superimposing the curves of FIG. 10 relating to engaging torque and piston stroke on the curve of FIG. 9 relating to the pressure at the outlet port 41b of the modulator valve 40. Therefore by fully engaging the clutch at a modulated pressure prior to increasing the fluid pressure in the clutch to line pressure results in the smooth engagement of the clutch without producing any undue shock.

Assuming that the embodiment of FIG. 8 is located in the conduit for supplying the pressurized fluid to the clutch of a transmission or the servo valve of brake, it may be desirable that the height and length of line "b" and the height and length of line "d" in FIG. 9 be changed according to the transmitting torque required at that time. This can be attained by supplying a throttle pressure to the drain port 41e which is changed according to the throttle opening degree of the engine. At this time the height of lines "b", "d" in FIG. 9 is high when the throttle pressure is high, and the length thereof is high when the throttle pressure is high. When pressurized fluid is supplied to the chamber 41h, the one-way valve 63 in the bypass conduit 33c supplies a time delay by the orifice 36 and when the clutch 15 is disengaged, the pressurized fluid within the chamber 41h is rapidly drained.

Figure 11:
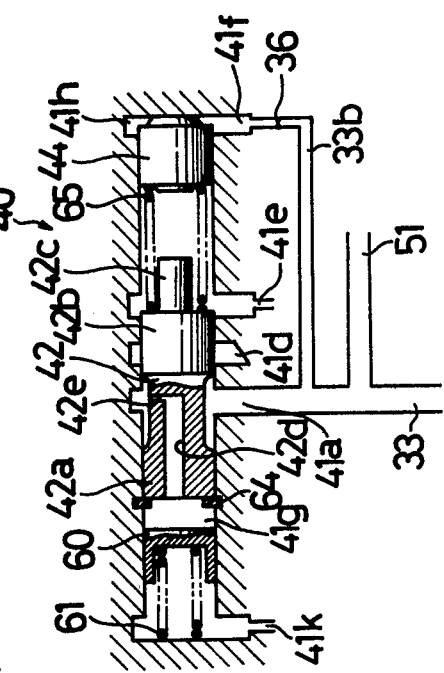
FIG. 11 is a similar view to FIG. 2, however, showing a fifth embodiment of the invention.

Next, referring to FIG. 11, a spring 65 is provided which takes the place of the spring 43 urging the valve 42 and the spring 49 urging the piston 44 in FIG. 8. The piston 44 which is biased by the spring 65 will move to the left in accordance with the increase of fluid pressure transmitted into the chamber 41h during the regulating operation of valve 42 and the force of spring 65 for regulating the valve 42 will be increased as the fluid pressure within the chamber 41h is increased while the valve 42 is regulated. As viewed from FIG. 12 the solid line "d" is gradually increased.

The differences in construction and operation of FIG. 11 from FIG. 8 will now be described hereinbelow in detail.

In FIG. 8 the pressurized fluid is supplied from the conduit 33a to the chamber 41g and the outlet port 41b is located to be controlled by the land 42a of valve 42. However, the conduit 33a and orifice 62 of FIG. 8 are provided in the valve 42 in FIG. 11 as a passage 42d having an orifice 42e. Also, in FIG. 11 the conduit 51 branches from the conduit 33 directly.

Figure 12:
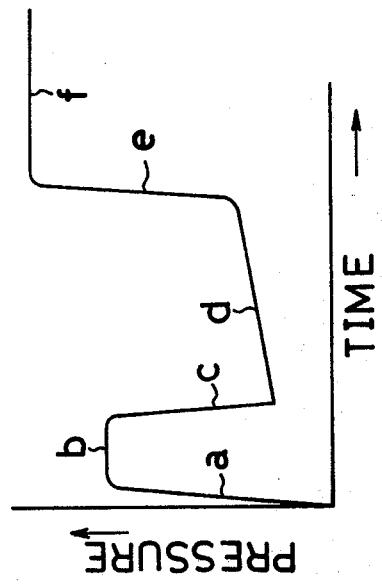
FIG. 12 is a similar view to FIG. 3, however, showing a modulated pressure by the modulator valve utilized in FIG. 11.

When the pressurized fluid is supplied to the conduit 33, the fluid pressure is changed as viewed in FIG. 12 and supplied to the clutch 15.

Obviously, many modifications and variations of the present invention are possible in light of the above teachings. It is therefore to be understood that within the scope of the appended claims the invention may be practiced otherwise than as specifically described herein.

What is claimed is:

1. A fluid pressure supplying apparatus for a fluidically actuated frictional engaging means adapted for use in a vehicle transmission, comprising:
a fluid pressure source;
first conduit means for fluidically communicating said fluid pressure source with said frictional engaging means;
regulator valve means disposed within said first conduit means for regulating the fluid pressure within said first conduit means to a predetermined line pressure;
manual valve means interposed in said first conduit means between said regulator valve means and said frictional engagement means for selecting forward or reverse drive; and
modulator valve means interposed in said first conduit means between said manual valve means and said frictional engaging means for supplying a high fluid pressure at the outlet of said modulator valve means less than said line pressure to said frictional engaging means until frictional engagement is initiated, for reducing said high pressure at the outlet of said modulator valve means to a pressure lower than said high pressure during frictional engagement, and for increasing the fluid pressure at the outlet of said modulator valve means to said frictional engaging means after said frictional engagement means is fully engaged, said modulator means comprises a first valve body having a longitudinal bore and a plurality of ports communicating therewith including an inlet port and an outlet port connected to said first conduit means and a drain port, a valve slidably diposed within said bore and provided with first and second lands for controlling communication between said inlet port and said outlet port and said drain port, a first accumulator piston slidably disposed within said bore coaxial with said valve for operative engagement with said valve, spring means urging said valve and said first accumulator piston in opposite directions, a second accumulator piston slidably disposed in said bore coaxial with said valve on the side opposite said first piston, additional spring means urging said second piston toward said valve, first restricted conduit means connecting said inlet port with said bore at the side of said first piston away from said valve and second restricted conduit means connecting said inlet port with said bore intermediate said second piston and said valve.

2. A fluid pressure supplying apparatus as set forth in claim 1 wherein said second restricted conduit means is disposed within said first valve means from a point intermediate said first and second lands to the end of said first valve adjacent said second piston.

* * * * *